(12) United States Patent  (10) Patent No.: US 7,298,591 B2
Matsumura et al.  (45) Date of Patent: Nov. 20, 2007

(54) ROTATING DISK STORAGE DEVICE WITH A RETRACTING ACTUATOR HEAD SUSPENSION ASSEMBLY

(75) Inventors: Satoshi Matsumura, Kawasaki (JP); Kenji Kuroki, Kanagawa (JP); Hiroki Kitahori, Kanagawa (JP); Shinichi Kimura, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 408 days.

(21) Appl. No.: 10/901,747

(22) Filed: Jul. 28, 2004

(65) Prior Publication Data

US 2005/0063098 A1  Mar. 24, 2005

(30) Foreign Application Priority Data

Sep. 18, 2003 (JP) ............................. 2003-326778

(51) Int. Cl.
  *G11B 5/54* (2006.01)
(52) U.S. Cl. .................................................... 360/256.2
(58) Field of Classification Search ............. 360/256.2
  See application file for complete search history.

(56) References Cited

U.S. PATENT DOCUMENTS 5,801,904 A * 9/1998 Kinoshita et al. ........ 360/256.2
5,801,907 A * 9/1998 Yagi et al. ................ 360/256.2
5,870,253 A * 2/1999 Ogawa et al. ........... 360/245.9
6,445,548 B1 * 9/2002 Sasaki et al. ............ 360/256.2
6,473,959 B1 * 11/2002 Macpherson et al. ...... 29/602.1
6,487,052 B1 * 11/2002 Macpherson et al. .... 360/256.2
6,532,136 B2 * 3/2003 Bae et al. ................ 360/256.2

* cited by examiner

*Primary Examiner*—A. J. Heinz
(74) *Attorney, Agent, or Firm*—Townsend and Townsend and Crew LLP; Rambod Nader

(57) ABSTRACT

Embodiments of the present invention provide a rotating disk storage device having a mechanism to reliably retract an actuator into a retraction area in the event that the power supply is suddenly interrupted. A bias chip is embedded in a coil support that supports the voice coil. When a head stays in an access area, the bias chip is away from an end of the voice coil magnet. Therefore, no influence of the magnetic leakage flux is exerted on the bias chip. When the head is in a retraction area, the bias chip is attracted under the influence of the magnetic leakage flux of the voice coil magnet, which thereby produces bias torque causing an actuator to pivotally move in a retraction direction. Accordingly, the bias torque can be utilized as energy for retracting the actuator immediately after power shutdown.

9 Claims, 9 Drawing Sheets

FIG.2
(A)
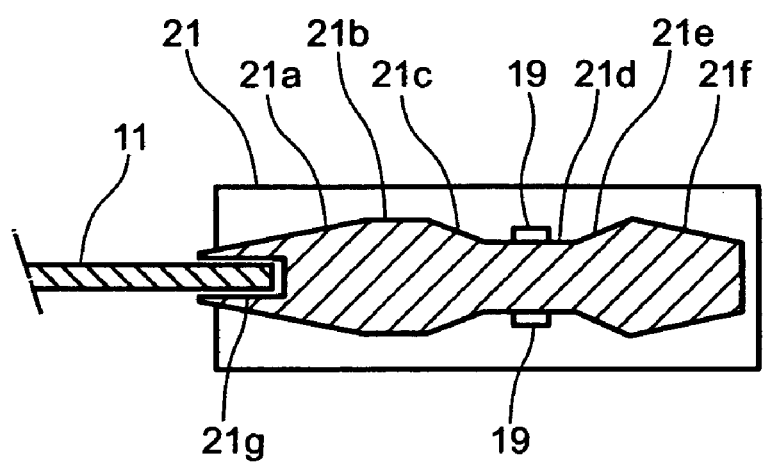
(B)
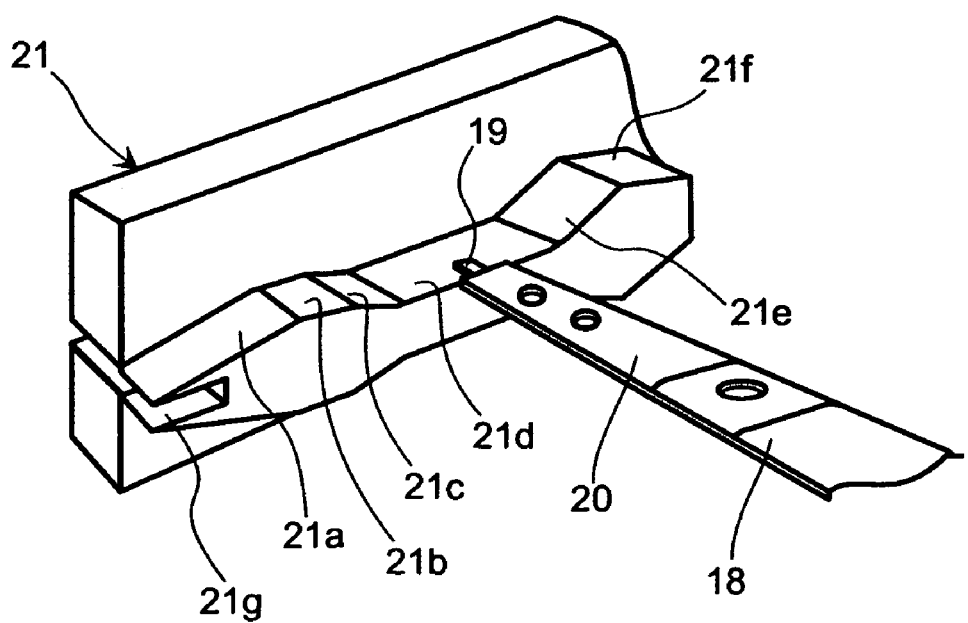

ROTATING DISK STORAGE DEVICE WITH A RETRACTING ACTUATOR HEAD SUSPENSION ASSEMBLY

BACKGROUND OF THE INVENTION

The present invention relates to a rotating disk storage device such as a magnetic disk drive and a magneto-optic disk drive, and more particularly to a mechanism for giving supplementary force to a driving mechanism of an actuator.

A magnetic disk drive pivotally moves a head/slider, which is supported by an actuator assembly, approximately in a radial direction of a magnetic disk while floating the head/slider with a slight gap being kept on a recording surface of a rotating magnetic disk, and thereby reads and writes data. A load beam used to support the head/slider generates a pressing load in the form of a pressure in a direction in which the head/slider is pressed on the recording surface of the magnetic disk. This pressing load is balanced with the buoyancy which an air bearing surface of a slider receives from airflow occurring on a surface of the magnetic disk. As a result, a given gap is kept between the air bearing surface and the recording surface.

While the magnetic disk is rotating at the given number of revolutions, because the airflow occurring on the surface acts, there is little possibility that the recording surface of the magnetic disk will come into contact with the slider. However, if the head/slider is located above the recording surface of the magnetic disk, the rotation of which is stopped, the head/slider will land on the recording surface because the action of the airflow is also stopped. In this case, a lubricant applied to the recording surface, inter-attraction occurring between smooth surfaces, that is to say, between the recording surface and the air bearing surface, the pressing load of the load beam, and the like, cause the head/slider to be attracted onto the recording surface of the magnetic disk. If a spindle motor holding the magnetic disk is rotated with the head/slider being attracted, a phenomenon of sticktion occurs, which may make a flaw in the slider and on the surface of the magnetic disk or may hinder a motor from starting.

Accordingly, in a magnetic disk drive that adopts the load-unload method, when stopping the rotation of the magnetic disk, the head/slider is retracted into a retraction area provided by a retraction mechanism that is called a ramp mounted outside the recording surface of the magnetic disk. In the event that the power supply is suddenly interrupted while the head/slider accesses the recording surface of the magnetic disk, no energy is available to drive an actuator assembly into the retraction area. Therefore, a voice coil motor (hereinafter referred to as "VCM") is driven by use of back electromotive force of the spindle motor coupled to the magnetic disk rotating by momentum, and an electric charge stored in a capacitor of an electronic circuit, to move the actuator assembly to a retraction position before the rotation of the magnetic disk stops. This is one way to prevent the sticktion from occurring.

With the progress of the miniaturization of magnetic disk drives, the number of turns of a voice coil, and a thickness of a voice coil magnet influencing on magnetic field strength of a yoke gap, are limited by spatial limitations. Therefore, it has become increasingly difficult to obtain a high torque from a VCM. Moreover, there are many limitations in the amount of back electromotive force of a spindle motor and the amount of an electric charge to be accumulated in a capacitor. Accordingly, in the case of the small-size magnetic disk drive, it is more difficult to reserve the energy for securely retracting a head/slider into a ramp in the event of interruption of the power supply, and also to obtain the torque required for pivotally moving an actuator assembly, as compared with a large-sized magnetic disk drive. This increases the possibility that sticktion will be caused by a failure in retraction.

Moreover, when a slight shock or vibrations are applied to the magnetic disk drive from outside after the actuator assembly has retracted to a home position of the ramp, if there is no mechanism for holding the actuator assembly at the home position, there is a possibility that the actuator assembly will gradually move toward the recording surface side of the magnetic disk and eventually the head/slider will jump on the recording surface. As a mechanism for holding the actuator assembly at the home position, there is a method in which a magnet is embedded in a crash stop. However, the strength of the magnet is limited to a range within which the actuator assembly can leave by the torque of a voice coil motor.

Therefore, even if the magnet is embedded in the crash stop, there may be a case where the actuator assembly cannot be held reliably at the home position. In addition, a size of the crash stop is also enlarged, which is not desirable for the miniaturization of the magnetic disk drives. Heretofore, there was a technology for producing attraction between a voice coil magnet and a metal chip embedded in a coil support to hold the actuator assembly at its home position. However, there is a limit in attraction as described above. As a result, the actuator assembly sometimes moved from the home position. What is more, the attraction could not also be utilized as retraction energy at the time of power shutdown.

BRIEF SUMMARY OF THE INVENTION

One feature of the present invention is to provide a rotating disk storage device having a function of reliably retracting an actuator head suspension assembly (hereinafter referred to as AHSA) into a retraction area even when the power supply is suddenly interrupted during operation. Another feature of the present invention is to provide a rotating disk storage device having a function of reliably holding the AHSA at its home position in the retraction area. Still another object of the present invention is to provide a rotating disk storage device in which a retraction mechanism for executing such functions is realized by use of a space-saving, simple structure.

Embodiments of the present invention produce a bias torque, which is a torque causing the AHSA to move from an access area toward a retraction area, by use of magnetic attraction acting between magnetic leakage flux of a voice coil magnetic circuit and a bias chip provided on the AHSA, and then to utilize the bias torque as force for retracting the AHSA into the retraction area at the time of the power shutdown. The bias torque can be utilized not only as the force for retracting the AHSA into the retraction area, but also as the torque for holding the AHSA in the retraction area. The voice coil magnetic circuit for generating the magnetic leakage flux is an indispensable component of the VCM, and therefore need not be specially prepared for the present invention. In addition, because the bias chip can be mounted without enlarging a size of the AHSA, no extra space is needed.

According to one aspect of the present invention, there is provided a rotating disk storage device, which comprises a rotating disk recording medium; an actuator head suspension assembly. The actuator head suspension assembly includes a head/slider that is accessible to the rotating disk recording medium; a voice coil used for pivotally moving said head/slider in a first direction in which the head/slider moves from an access area above the rotating disk recording medium toward a retraction area; and in a second direction in which the head/slider moves from the retraction area toward the access area, and a coil support for supporting the voice coil. A bias chip is mounted to the actuator head suspension assembly, and moves pivotally in the first direction and in the second direction. A voice coil magnetic circuit has a yoke gap space where a bias end is formed as a projecting part that projects in a direction approaching a pivotal locus of the bias chip in the vicinity of an on-route position within a pivoting range of the bias chip.

Magnetic leakage flux exists outside the yoke gap space, and its magnetic field has a vector component in the horizontal direction. The magnetic leakage flux formed in the bias end of the yoke gap space exerts the influence upon the bias chip, and thereby attraction is produced. If the bias chip is formed of a metal chip, the magnetic leakage flux magnetizes the bias chip to generate attraction. If the bias chip is a permanent magnet, attraction is generated between the magnetic poles. The attraction can be utilized as a bias torque causing the AHSA to pivotally move from the access area to the retraction area. A nonbias end does not exert a substantial influence of the magnetic leakage flux on the bias chip.

The bias end and the nonbias end are also ends of the yoke gap space. Depending on the configuration of the voice coil magnetic circuit, they correspond to ends of the voice coil magnet, or correspond to ends of the voice coil yoke. If the bias end is provided in the vicinity of an on-route position along a pivotal locus of the bias chip in such a manner that the bias end projects toward the pivotal locus of the bias chip, the bias end can be utilized as a supplementary driving force of the VCM that pivotally moves the AHSA. In addition, a transition part corresponding to a border between the bias end and the nonbias end is provided in the vicinity of an on-route position within a pivoting range of the bias chip.

The pivoting range of the bias chip is equivalent to a pivoting range of the AHSA, and is a range delimited by an outer crash stop and an inner crash stop. The on-route position of the pivoting range means a position other than the vicinity of the outer crash stop, the vicinity of the inner crash stop, and the vicinity of the home position.

If bias ends are provided from the transition part up to a position in the vicinity of the home position of the bias chip so that the bias ends are close to and substantially follow a pivotal locus of the bias chip moving pivotally in the retraction area, the bias torque is continuously applied to the bias chip in the first direction from the vicinity of the transition part to the home position in the whole pivoting range of the bias chip. Here, pivoting of the bias chip in the retraction area is the same as pivoting of the AHSA in the retraction area. The home position of the bias chip means a position of the bias chip when the AHSA is located at the home position. Other cases are also read in like manner.

If the transition part is provided in the vicinity of the bias chip located at a border between the access area and the retraction area, a bias torque is produced only when the bias chip moves pivotally in the retraction area, whereas no extra torque is produced in the access area, exerting no influence on operation of the VCM and a servo-control mechanism. In addition, the bias torque continuously acts while the bias chip moves pivotally in the retraction area. Accordingly, the AHSA is temporarily placed at the home position. If the AHSA is held at the home position by use of a well-known magnet mechanism, even if vibrations, or the like, cause the AHSA to move away from the home position in the retraction area, the bias torque acts so long as the AHSA exists in the retraction area. Therefore, even if a light shock, or the like, is further applied from outside, it is possible to prevent the AHSA from moving to the access area.

Moreover, if the amount of the bias torque and a pressing load of the AHSA are properly selected, the AHSA which has temporarily moved from the home position can be pulled back to the home position. If the AHSA moves from the home position in the retraction area, there is a possibility that a well-known inertia latch mechanism for holding the AHSA in the retraction area against a heavy shock will not work. Therefore, it is important to hold the AHSA at its home position.

The nonbias end does not produce a substantial torque because magnetic leakage flux existing there does not influence the bias chip. Such a configuration can be realized by increasing a distance between the nonbias end and the bias chip, or by passing the bias chip through the yoke gap space. If a pivotal locus of the bias chip is provided outside the end of the yoke gap space while keeping a sufficient distance away from the end, the influence of the magnetic lines of force in the yoke gap space is extremely little, and accordingly no substantial bias torque is produced in the bias chip.

The pivotal locus of the bias chip may be provided outside the back end of the yoke gap space, or outside the front end. By partially providing in the yoke gap space a projecting part which projects to approach the pivotal locus of the bias chip, it is possible to apply a strong bias torque to the bias chip located in the vicinity of the projecting part. Torque characteristics of the bias torque can be controlled by forming a projecting part at a required position. As for a device using the load-unload method, a strong torque can also be produced in a position where its bias chip retracts into a ramp. Additionally, in a configuration in which a pivotal locus of the bias chip gradually approaches the bias end, bias torque can be gradually increased.

The bias chip maybe formed of a ferromagnetic material, or may also be formed of a permanent magnet. If a permanent magnet is used, a strong bias torque can be produced even if magnetic leakage flux is weak. Incidentally, the voice coil magnetic circuit can be configured by providing a plurality of voice coil magnets, or by placing a voice coil magnet on the back of a voice coil yoke.

According to another aspect of the present invention, there is provided a rotating disk storage device which comprises a rotating disk recording medium; an actuator head suspension assembly that is equipped with a head/slider which is accessible to the rotating disk recording medium, and that can move about a pivot shaft in a first direction in which the head/slider moves from an access area toward a retraction area and in a second direction in which the head/slider moves from the retraction area toward the access area; a voice coil magnetic circuit that forms a magnetic field of a voice coil motor for driving the actuator head suspension assembly; and a bias chip mounted to the actuator head suspension assembly. The bias chip is attracted under the influence of magnetic leakage flux of the voice coil magnetic circuit, and consequently the bias chip applies a bias torque in the first direction to the actuator head suspension assembly located in the vicinity of a border between the access area and the retraction area.

According to still another aspect of the present invention, there is provided a rotating disk storage device which comprises a rotating disk recording medium; and an actuator head suspension assembly including a coil support, a voice coil supported by the coil support, and a head/slider that is accessible to the rotating disk recording medium. The actuator head suspension assembly is capable of pivotally moving in a first direction in which the head/slider moves from an access area toward a retraction area and in a second direction in which the head/slider moves from the retraction area toward the access area. A bias chip is mounted to the actuator head suspension assembly, and moves pivotally in the first direction and in the second direction. A voice coil magnetic circuit has a yoke gap where ends are formed substantially along a pivotal locus of the bias chip. The ends of the yoke gap continuously apply a bias torque in the first direction to the bias chip moving pivotally in the retraction area.

According to embodiments of the present invention, it is possible to provide a rotating disk storage device having a function of reliably retracting an actuator head suspension assembly into a retraction area even when the power supply is suddenly interrupted during operation. Moreover, it is possible to provide a rotating disk storage device having a function of reliably holding the AHSA at its home position in the retraction area. Furthermore, it is possible to provide a rotating disk storage device in which a retraction mechanism for executing such functions is realized by use of a space-saving, simple structure.

BRIEF DESCRIPTION OF THE DRAWINGS

FIG. 2(A) is a side view of a ramp; and FIG. 2(B) is a perspective view of the ramp.

DETAILED DESCRIPTION OF THE INVENTION

Figure 1:
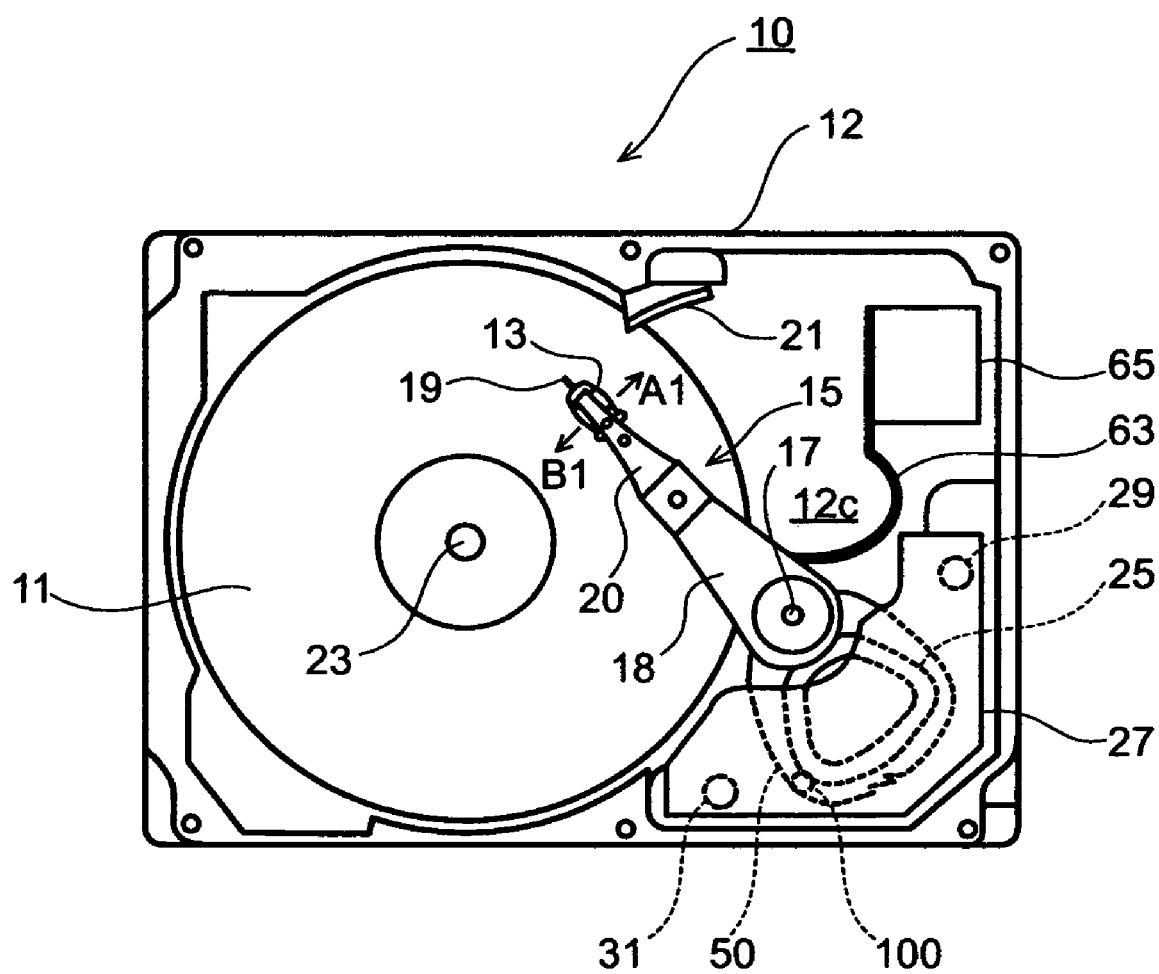
FIG. 1 is a schematic plan view of a magnetic disk drive 10, which is used to illustrate an embodiment of the present invention.
Figure 3:
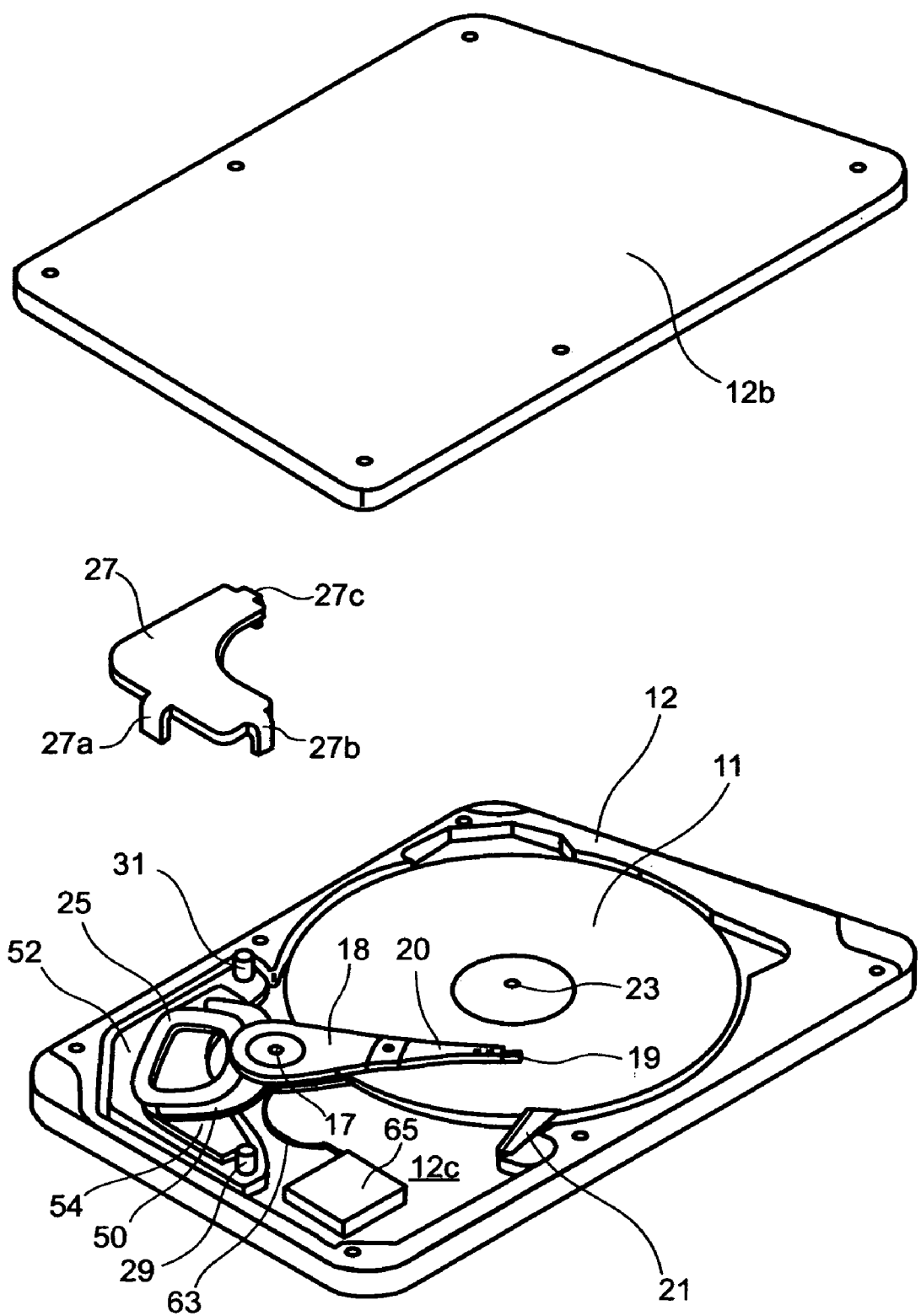
FIG. 3 is an exploded perspective view of a magnetic disk drive according to the embodiment of the present invention.

A magnetic disk drive according to an embodiment of the present invention will be described with reference to FIGS. 1 through 3. FIG. 1 is a schematic plan view of a magnetic disk drive 10. FIG. 2(A) is a side view of a ramp 21; and FIG. 2(B) is a perspective view of the ramp 21. FIG. 3 is an exploded perspective view of the magnetic disk drive 10. The magnetic disk drive 10 is housed in a casing body 12 to which a casing lid 12b (refer to FIG. 3) is mounted. The casing body 12 is mainly constituted of a base 12c for providing stored parts with mounting surfaces, and side walls to which the casing lid 12b is mounted. The casing body 12 is formed by pressing a metal flat board.

A disc-shaped magnetic disk 11 has recording surfaces on both sides, each of which is covered with a magnetic layer formed on its surface. The magnetic disk 11 is attached to a hub that is coupled to a spindle motor provided on the lower part. The magnetic disk 11 rotates about a spindle shaft 23. As described below, the magnetic disk drive 10 according to this embodiment adopts a load-unload method as a retraction method. However, a contact start stop (hereinafter referred to as CSS) method may also be adopted. A magnetic disk drive which adopts the CSS method has retraction surfaces not only on the recording surfaces but also on a part of the magnetic disk 11 so as to provide a retraction area for a slider. Although the magnetic disk 11 can have a stack configuration constituted of one or more disks, the magnetic disk 11 in this embodiment is constituted of one magnetic disk. In the magnetic disk 11, an innermost radius track located in the innermost area and an outermost radius track located in the outermost area are defined.

An AHSA 15 comprises a head suspension assembly (HSA) 20, an actuator arm 18, a coil support 50, and a voice coil 25 supported by the coil support. The AHSA 15 is mounted to the base by a pivot cartridge so that the AHSA 15 can move pivotally on a pivot shaft 17 in directions of A1 and B1. The actuator arm 18, the coil support 50, and a mounting portion of the pivot cartridge, are molded as one body by aluminum die-casting or synthetic resin. However, the well-known lamination layer suspension structure may also be adopted; more specifically, HSA 20 or a head gimbal assembly is directly mounted to the pivot cartridge.

For the purpose of obtaining bias torque according to the present embodiment, a metal chip is embedded in a coil support 50. The metal chip is made of a ferromagnetic material such as iron, and forms a bias chip 100. A piece of permanent magnet (magnet chip) may be adopted for the bias chip 100. By adopting the magnet chip, the attraction applied to a voice coil magnet becomes stronger as compared with the case where the metal chip is adopted. The bias chip 100 is formed in a column shape, and is inserted into an opening so that a surface of the bias chip 100 is exposed. The opening is formed in such a manner that the coil support is penetrated in the up-down direction. Accordingly, the bias chip 100 does not hinder the coil support 50 from pivotally move about a yoke gap described below. In addition, the bias chip 100 has a structure that is suitable for magnetizing its surface with a magnetic field of the voice coil magnet. Moreover, the bias chip 100 occupies no extra space of the magnetic disk drive 10.

The AHSA 15 has a structure in which the center of gravity lies above the pivot shaft 17 so that servo control is not significantly influenced by vibrations or a shock coming from outside during operation. The HSA 20 comprises a load beam attached to the actuator arm 18, and a flexure attached to the load beam. A merge lip 19 or a tab is provided at the tip of the load beam. A head/slider 13 is attached to the flexure.

The head/slider 13 is constituted of the following: a head that reads data from and/or writes data to the magnetic disk 11; and a slider that is equipped with the head and floats on a recording surface with a slight gap being kept by the buoyancy of an airflow on the surface of the rotating magnetic disk. The slider is mounted to the flexure in a manner that a surface of an air bearing is opposed to the recording surface of the magnetic disk 11. The load beam creates pressure (pressing load) in such a direction that the pressure presses the head/slider 13 onto the recording surface of the magnetic disk 11. Because there is a possibility that the head/slider 13 will touch the recording surface of the magnetic disk during operation, lubricant used for preventing damage is applied to the recording surface.

The coil support 50 for supporting the voice coil 25 is provided at the back end of the AHSA 15. Further, a voice coil yoke which serves as a main yoke 27 is placed so as to cover the coil support 50. The voice coil yoke is supported by the base 12c. The main yoke 27, the voice coil magnet 54, an auxiliary yoke 52, and the base 12c of the casing constitute a voice coil magnetic circuit; and the voice coil magnetic circuit and the voice coil 25 constitute a VCM. Placing the voice coil 25 in a magnetic field of the yoke gap that is formed by the main yoke 27 and the voice coil magnet 54, and subsequently applying an electric current, and then controlling a direction of the electric current, permit the AHSA 15 to move pivotally in an A1 direction or in a B1 direction.

A voice coil magnetic circuit will be described in detail later with reference to FIG. 3. Here, as for the AHSA 15 and the VCM, each head/slider side is called the tip side or a tip, and its opposite side is called the back end side or a back end. In an area between the main yoke 27 and the auxiliary yoke 52, an outer crash stop 31 and an inner crash stop 29 are mounted on the base of the casing so that they are kept standing up. Each of the crash stops is formed by including an elastic body such as rubber.

Figure 6:
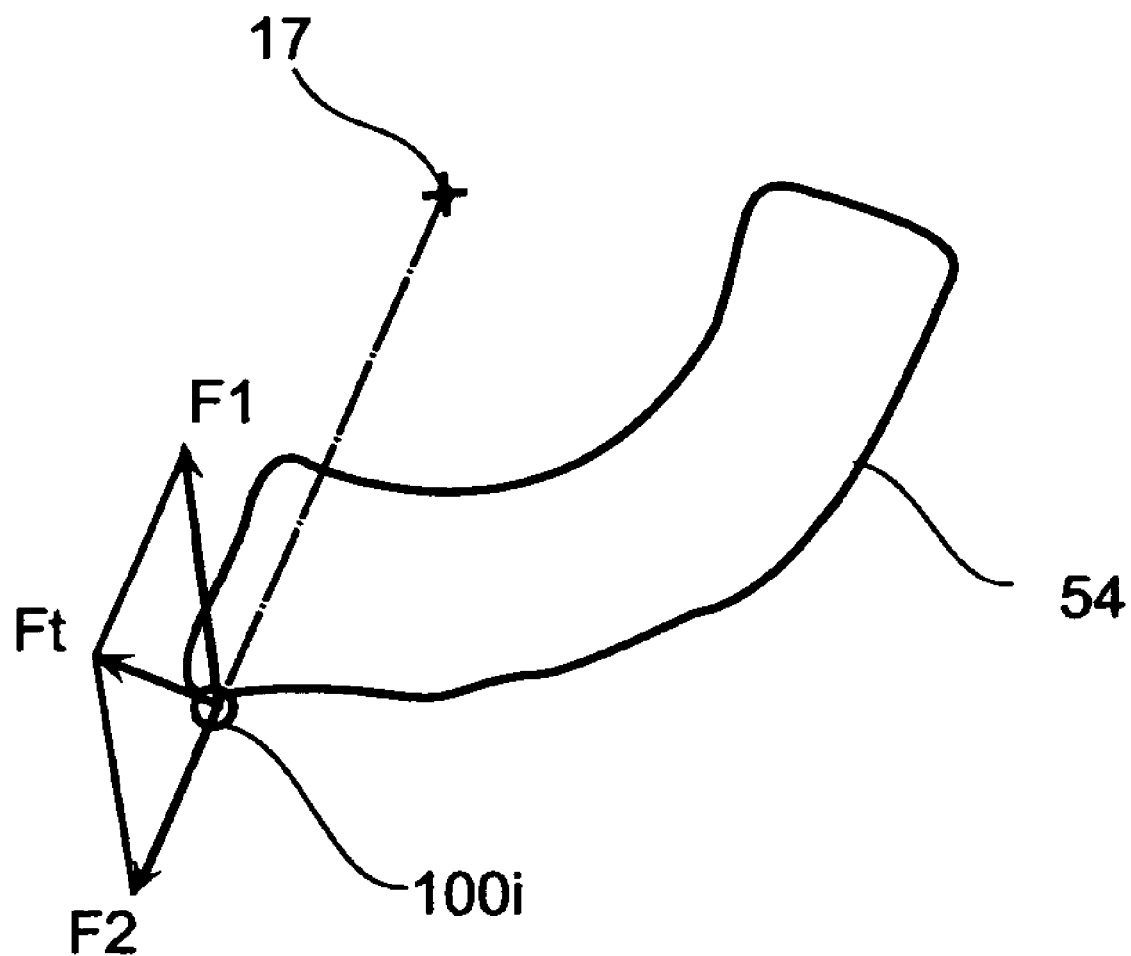
FIG. 6 is a diagram illustrating the force acting on a bias chip.

The outer crash stop 31 limits movement in a direction in which the head/slider 13 of the AHSA 15 moves pivotally to the outside of the magnetic disk; and the inner crash stop 29 limits movement in a direction in which the head/slider 13 pivotally moves toward the spindle shaft 23. In addition, in order to structure the outer crash stop 31, the following method may also be used: mounting a stiff rod on the base so that the stiff rod is kept standing up, and attaching an elastic body to a point of contact of the coil support 50. Moreover, as shown in FIG. 6 of Japanese Patent Application Laid-Open No. 2000-243044 by use of reference numbers 46, 47, a part of the coil support may also have an elastic function. Additionally, a structure in which an elastic member is attached to a leg of the voice coil yoke may also be adopted. The magnetic disk drive 10 further comprises a circuit element 65 for controlling communications and operation, and a flexible cable 63 for connecting the head and the voice coil 25 to the circuit element.

A ramp 21 is attached near and outside the magnetic disk 11 to realize a load-unload method in the magnetic disk drive 10. In this embodiment, the magnetic disk 11 has two recording surfaces. Therefore, FIG. 2(A) shows two merge lips 19; and FIG. 2(B) shows the HSA 20, which is a part of one AHSA, for the sake of simplicity of description. The ramp 21 is provided with a slit 21g into which a circumferential part of the magnetic disk 11 is inserted while keeping the magnetic disk 11 rotatable. Before the number of revolutions of the magnetic disk 11 decreases to a given value or less, the ramp 21 provides a retraction area to which the head/slider is allowed to retract. Viewing from the side of the magnetic disk 11, the ramp 21 has a sloping surface 21a, a flat surface 21b, a sloping surface 21c, a flat surface 21d, a sloping surface 21e, and a sloping surface 21f. After mounting the ramp 21 to the base 12c of the casing, the merge lip 19 is inserted from the back of the ramp. The sloping surfaces 21e, 21f are provided to build the AHSA 15 into the base.

In FIG. 1, when pivotally moving the AHSA 15 in the A1 direction from the recording surface of the magnetic disk 11 to unload the AHSA 15, more specifically, to retract the AHSA 15 into the retraction area, the merge lip 19 touches a tip of the sloping surface 21a, and the head/slider 13 which is floating is slightly lifted. Further pivoting the AHSA 15 causes the head/slider 13 to gradually move in a direction away from the recording surface of the magnetic disk. As a result, the head/slider 13 reaches a border with the flat surface 21b. The load beam of the HSA 20 is devised to apply a pressing load to the head/slider 13 on the recording surface. Accordingly, while the merge lip 19 slides on the sloping surface 21a until the merge lip 19 reaches the border with the flat surface 21b, a pressing load to each surface of the ramp of the HSA 20 is gradually increased, resulting in an increase in frictional force that hinders the AHSA 15 from pivotally moving in the A1 direction.

Driving force of the VCM overcomes this frictional force, and permits the AHSA 15 to move pivotally further in the A1 direction. After the merge lip 19 reaches the flat surface 21d by way of the flat surface 21b and the sloping surface 21c, further pivoting the AHSA 15 in the A1 direction causes the VCM to be controlled so that the merge lip 19 stops at a given position on the flat surface 21d. In this embodiment, the VCM is devised to stop at a position where the AHSA 15 comes into contact with the outer crash stop. Not only the configuration described in this embodiment, but also a configuration in which the AHSA 15 stops on the flat surface 21d without coming into contact with the outer crash stop, may also be adopted. The position at which the AHSA 15 stops by unload during the usual operation excluding the operation at the time of the occurrence of an abnormal condition such as runaway and power interruption is called a home position of the AHSA.

In FIG. 2(A), the flat surface 21d of the ramp 21 is in a position that is away from the recording surface of the magnetic disk 11 in the vertical direction. Accordingly, when the merge lip 19 engages with the flat surface 21d and thereby the head/slider 13 retracts, the load beam presses the merge lip 19 to the flat surface 21d. As a result, the frictional force which hinders the AHSA 15 from pivotally moving is generated. When the merge lip 19 engages with the flat surface 21d, even if a slight shock or vibrations are applied to the magnetic disk drive 10 from outside, the frictional force, which is caused by the sloping surface 21c, the flat surface 21b, and the sloping surface 21a and is applied to the merge lip 19, serves a function of preventing the AHSA 15 from moving in the B1 direction.

Thus, because of the frictional force on each surface of the ramp, even if a weak shock or vibrations are applied from outside, the AHSA 15 which is located at a home position can stay at the home position or can stay in the flat surface 21d, or the sloping surface 21a, of the ramp. However, the driving force of the VCM is required to overcome the frictional force acting to the merge lip 19 at the time of loading that subsequently pivotally moves the AHSA 15 in the B1 direction. The frictional force, therefore, cannot be provided so strongly.

Accordingly, while the merge lip 19 of the AHSA 15 is retracting into the ramp, if a strong shock is applied to the magnetic disk drive 10 from outside, or if the magnetic disk drive 10 operating becomes uncontrollable and consequently runs away, there is a possibility that the coil support 50 will violently collide against the outer crash stop 31, and in reaction to this, the head/slider will touch the recording surface of the magnetic disk 11 which stops after moving pivotally in the B1 direction. In addition, depending on a direction of the shock, the head/slider 13 may directly move pivotally in the B1 direction instead of colliding against the outer crash stop 31, with the result that the head/slider 13 jumps onto the recording surface of the magnetic disk 11.

Incidentally, the magnetic disk drive 10 is so devised that if the power supply is suddenly interrupted while the head/slider 13 accesses the magnetic disk 11, in order to retract the head/slider 13 into the ramp 21 before the spindle motor stops, the AHSA 15 is swung in the A1 direction until the coil support 50 collides against the outer crash stop 31 as a result of the back electromotive force of the spindle motor or an electric charge accumulated in a capacitor. In this case, in order to retract the AHSA 15 so that the merge lip 19 engages with the home position of the flat surface 21d of the ramp 21, not only the energy which pivotally moves the AHSA 15 but also the energy which overcomes the frictional force of the sloping surface 21a, the flat surface 21b, the sloping surface 21c, and the flat surface 21d, of ramp 21 is needed.

In FIG. 3, the casing lid 12b is attached to the side wall of the casing body 12, and thereby forms a clean sealed space inside. What is shown below the casing lid 12b is the main yoke 27 in a state in which it is removed from the casing body 12. Accordingly, on the side of the casing body 12, the coil support 50, the voice coil 25 supported by the coil support, the voice coil magnet 54, and the auxiliary yoke 52 can be seen. On the main yoke 27, three yoke legs 27a through 27c are formed by folding the main yoke.

The main yoke 27 and the auxiliary yoke 52 are formed of a general cold rolled steel plate sheet (SPCC) that is a ferromagnetic material. Because the casing body 12 is formed of a ferromagnetic material, it can constitute a part of the magnetic circuit of the VCM. The auxiliary yoke 52 formed in a flat-board shape is placed on the base 12c of the casing body 12, and is secured to the base 12c with an adhesive. The adhesive is sold by ThreeBond International, Inc., and can be purchased by the product number 2087F. The voice coil magnet 54 made of a permanent magnet is placed on the surface of the auxiliary yoke 52, and is secured to the surface with an adhesive. The adhesive is available as a product name LOCTITE 366 from Loctite Corporation. The voice coil magnet 54 is formed as one body having two magnetic poles of the N pole and the S pole on a surface in contact with space. Both magnetic poles are separated in a transition region. On the back of the voice coil magnet 54, which is in contact with the auxiliary yoke 52, a magnetic pole, the polarity of which is the reverse of the front, is formed.

The main yoke 27 has an opposing surface that is opposed to a surface of the voice coil magnet 54. A yoke gap is formed between the opposing surface of the main yoke 27 and the surface of the voice coil magnet 54. The yoke legs 27a through 27c of the main yoke 27 engage with the side of the auxiliary yoke 52 when they are assembled. The yoke leg 27a through 27c are produced with their sizes being strictly managed so that they engage with the side of the auxiliary yoke 52. As a result, if the auxiliary yoke 52 is first secured to the base 12c at a given position in an assembling process, when incorporating the main yoke 27 next, only fitting the yoke leg 27a through 27c into the side of the auxiliary yoke 52 can achieve accurate positioning on the base 12c.

Heretofore, for the purpose of the positioning of the main yoke 27, screws were used to secure the yoke legs to the base 12c. However, a subordinate process for sealing threaded screw holes which penetrate the base was required. In this embodiment, only fitting the main yoke into an engaged portion of the auxiliary yoke by use of the yoke legs can achieve accurate positioning on the base. The yoke legs 27a through 27c are magnetically coupled to the side of the auxiliary yoke 52, and are also magnetically coupled to the base 12c. The yoke legs 27a through 27c may also be magnetically and directly coupled only to the auxiliary yoke 52 by mounting them on the auxiliary yoke 52. Nevertheless, it is advantageous to mount the yoke legs 27a through 27c on the base 12c because tolerance in a height direction of the yoke structure is satisfied.

To be more specific, the height from the base 12c to the surface of the main yoke 27 on the casing lid side, and the height to the opposing surface opposed to the voice coil magnet 54, should be strictly managed to avoid interference with the casing lid and the coil support 50. However, if the yoke legs 27a through 27c are placed on the auxiliary yoke 52, a process error of the auxiliary yoke 52 is superposed. Accordingly, it is desirable to place the yoke legs 27a through 27c directly on the base 12c.

The main yoke 27 is formed of the same ferromagnetic material as that used in the auxiliary yoke 52. However, if a material having permeability which allows magnetic flux to pass through is used, it is possible to properly choose both materials from among different kinds of materials. In this embodiment, the following values are selected: a thickness of the base 12c is about 0.4 mm; a thickness of the auxiliary yoke 52 is about 0.3 mm; a thickness of the voice coil magnet 54 is about 0.8 mm; a thickness of the main yoke 27 is about 0.45 mm; and an interval of the yoke gap is about 0.8 mm.

The voice coil magnet 54 forms magnetic fields in two directions, upward and downward, in the yoke gap. The voice coil 25 is placed so that the voice coil 25 can move freely in the horizontal direction in the yoke gap. If an electric current is applied to the voice coil 25, the force on each side of the voice coil generated by a magnetic field in each direction is combined, causing the AHSA 15 to move about the pivot shaft 17.

By changing a direction and the amount of the electric current applied to the voice coil 25 by use of the well-known servo control technology, the AHSA 15 can move the head to a given track position on the magnetic disk 11. In order to increase the torque of the VCM applied to the AHSA 15, there are the following methods: increasing the amount of the magnetic flux passing through the yoke gap; increasing the amount of the electric current flowing through the voice coil 25; and increasing the number of turns of the voice coil.

As a method for increasing the amount of the magnetic flux passing through the yoke gap, enlarging the size of the voice coil magnet 54 can be considered. However, there is a limit in space. Another method is to decrease the magnetic reluctance of the whole magnetic circuit that provides a path of the magnetic flux passing through the yoke gap. The magnetic reluctance is generated in the yoke gap and the yoke. Because the voice coil must be placed in the yoke gap, the reduction is limited. The magnetic reluctance of the yoke is determined by the permeability and a cross-sectional area of a yoke material.

In this embodiment, the yoke is constituted of the main yoke 27, the yoke legs 27a through 27c, the auxiliary yoke 52, and the base 12c. If the base 12c is formed of a material with small permeability, or if the base 12c is formed of a thin material, a cross-sectional area of which is insufficient, the base 12c cannot pass the magnetic flux sufficiently. This shows that the base 12c alone is not suitable for forming the voice coil magnetic circuit. For this reason, in this embodiment, the auxiliary yoke 52 in combination with the base 12c forms the magnetic circuit providing a path of magnetic flux, which reduces the magnetic reluctance.

The magnetic flux emitted from the N pole of the voice coil magnet 54 into the yoke gap penetrates the opposing surface of the main yoke 27, and enters in the main yoke 27. The magnetic flux is then split into the yoke legs 27a through 27c. Because the casing lid 12b is formed of a nonmagnetic material, little magnetic flux passes through the casing lid 12b. Even if the casing lid does not provide a path of magnetic flux, the main yoke can form a magnetic circuit sufficiently. Accordingly, although it is not necessary to magnetically couple the main yoke 27 to the casing lid 12b, the casing lid can be formed as part of the magnetic circuit by changing the material of the casing lid. A part of the magnetic flux passing through each yoke leg flows into the auxiliary yoke 52 through its side, and then returns to the S pole of the voice coil magnet 54. Remaining magnetic flux flows into the base 12c from the bottom of the yoke leg, and then passes through the auxiliary yoke before returning to the S pole of the voice coil magnet 54. The magnetic flux returning to the S pole of the voice coil magnet from the yoke gap returns to the N pole through a path in the direction opposite to that of the magnetic flux emitted from the N pole into the yoke gap.

In the yoke structure according to this embodiment, a dedicated yoke placed on the lower part, which was adopted by the conventional yoke structure, is eliminated; and the auxiliary yoke and the casing body are incorporated as part of the magnetic circuit. Therefore, it is possible to adopt an auxiliary yoke that is thinner than the dedicated lower yoke. This makes it possible to shorten the height of the whole yoke structure.

From the viewpoint of the principles of the present invention, placing the auxiliary yoke 52 in a state in which the auxiliary yoke 52 is magnetically coupled to the casing body 12 suffices. Therefore, a method other than the adhesive may also be used; for example, the auxiliary yoke 52 may also be secured to the base 12c by use of screws or a fitting structure. In addition, if the main yoke 27 is secured to the base 12c by use of a screw stopper structure, or the like, and if a position of the auxiliary yoke can be delimited by the yoke legs 27a through 27c and the side of the auxiliary yoke 52 with reference to a position of the main yoke, it is not necessary to secure the auxiliary yoke 52 to the base 12c.

An important point about the auxiliary yoke is to form a magnetic circuit that is magnetically coupled to the base 12c, and that thereby easily passes the magnetic flux generated by the voice coil magnet 54. Because of it, a cross section area of the auxiliary yoke 52 should be set at greater than or equal to a given value so as not to cause magnetic saturation; and the magnetic coupling of the auxiliary yoke 52 to the base 12c should be sufficiently made. In order to increase the magnetic coupling, it is necessary to eliminate an air gap in a joint surface area between the auxiliary yoke 52 and the base 12c. Therefore, it is desirable to process both of them so that they can be in touch with each other on flat surfaces, each of which occupies a given area or more. From the viewpoint of the principles of the present invention, only the main yoke capable of forming a magnetic circuit alone without using the auxiliary yoke may also form a magnetic circuit. Moreover, the voice coil magnet may also be attached not only to one yoke surface but also to the other surface. In this case, a magnetic field of the yoke gap is increased, and thereby the VCM can produce a stronger torque.

Figure 4:
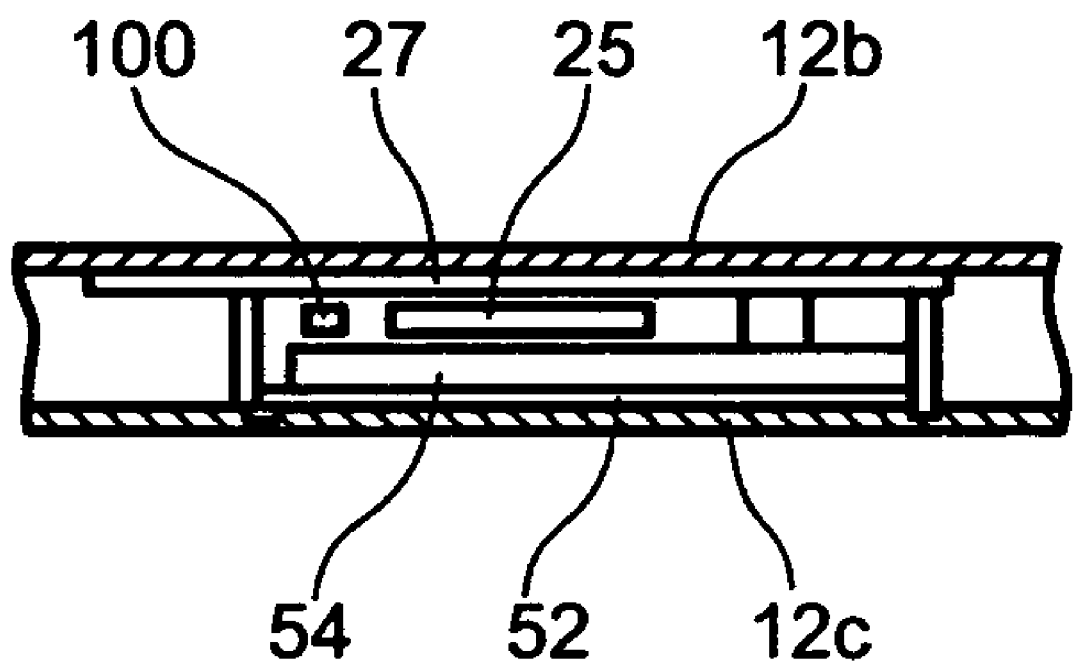
FIG. 4 is a side view of a VCM mechanism relating to the embodiment of the present invention.

FIG. 4 is a side view illustrating the VCM mechanism described with reference to FIG. 3. In FIG. 4, the coil support 50 is omitted. In the lower part of the main yoke 27 having a flat surface, a yoke gap is formed between a flat board shaped voice coil and the magnet 54. The voice coil magnet 54 forms a magnetic field in the yoke gap in which the bias chip 100 and the voice coil 25 are placed with their heights being substantially the same. The bias chip 100 and the voice coil 25 are supported by the coil support 50 that is not shown. The auxiliary yoke 52 is adjacently placed under the voice coil magnet 54, and the auxiliary yoke 52 is adjacent to the base 12c of the casing.

Figure 5:
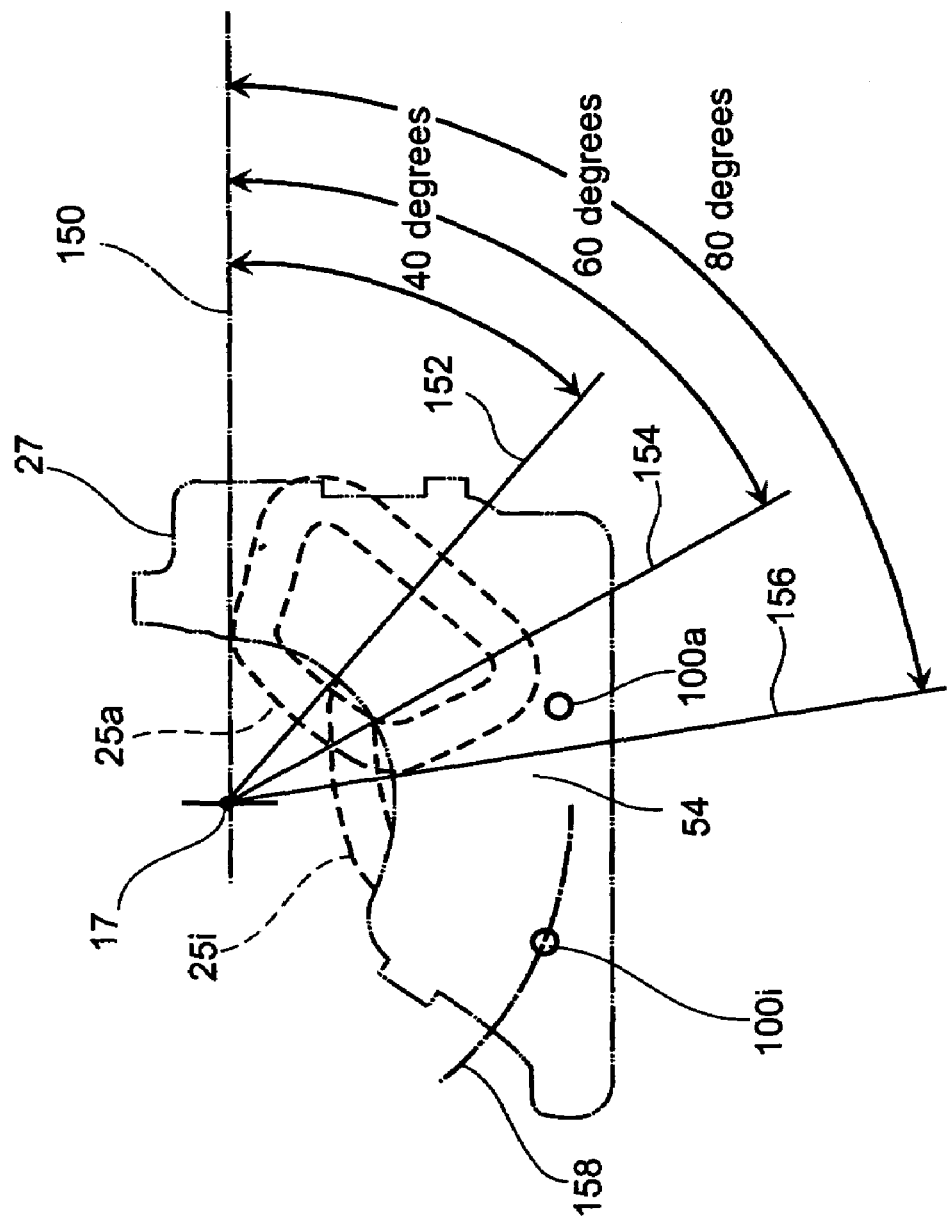
FIG. 5 is a diagram illustrating a pivoting range of an AHSA.

FIG. 5 is a diagram illustrating a pivoting range of the AHSA 15 (refer to FIGS. 1 and 3). In FIG. 5, the voice coil magnet 54 and the bias chip 100 are shown with solid lines because their positions are important; and the voice coil 25 and the main yoke 27 are shown with a dotted line and a chain double-dashed line respectively. Center lines 152, 154, 156 ate center lines of the AHSA 15 in a state in which the head/slider 13 is located at a specific position in FIG. 1 or FIG. 3. The center lines 152, 154, 156 pass through the pivot shaft 17 and the center of the head/slider 13.

A base line 150 is a line that is parallel to the long side wall of the casing body 12, and that passes through the center of the pivot shaft 17. The center line 152 which is obtained by rotating the AHSA 15 by about 40 degrees from the base line 150 in the clockwise direction is a position where the AHSA 15 comes into contact with the inner crash stop 29. In this state, the head/slider 13 is located at the innermost position of the magnetic disk 11, which corresponds to the inner limit of the pivoting range of the AHSA 15. The voice coil 25a and the bias chip 100a illustrated in the figure indicate their positions at that time.

The center line 154 which is obtained by rotating the AHSA 15 by about 60 degrees from the base line 150 in the clockwise direction is a position where the merge lip 19 shown in FIGS. 1 and 2 comes into contact with a tip of the sloping surface 21a of the ramp 21. A large part of the pivoting range delimited by the center line 152 and the center line 154 is a range within which the AHSA 15 pivotally moves to permit the head/slider 13 to access the recording surface of the magnetic disk 11. The voice coil and the bias chip corresponding to the position of the center line 154 are not illustrated to avoid complication of the figure.

The center line 156 which is obtained by rotating the AHSA 15 by about 80 degrees from the base line 150 in the clockwise direction is a position where the AHSA 15 comes into contact with the outer crash stop 31, which corresponds to the outer limit of the pivoting range of the AHSA 15. The voice coil 25i and the bias chip 100i illustrated in the figure indicate their positions at that time. Between the center line 154 and the center line 156, the merge lip 19 of the AHSA 15 engages with one of the surfaces of the ramp 21.

The voice coil magnet 54 and the main yoke 27 are placed so that they are substantially opposed to each other in parallel. Magnetic flux, which vertically goes in and out the voice coil magnet or the main yoke, passes through a yoke gap. A component in the horizontal direction, therefore, does not exist. However, at the end that determines planar extension of the voice coil magnet 54, more specifically, outside the planar extension of the voice coil magnet 54 indicated with a solid line in FIG. 5, a part of the magnetic flux does not vertically go in and out, causing magnetic leakage flux.

When the AHSA 15 is at a position of the center line 152, the bias chip 100a is away from the end of the voice coil magnet 54, two-dimensionally toward the outside on the back end side. Accordingly, there is little possibility of being influenced by the magnetic leakage flux occurring at the end of the voice coil magnet 54. Thus, magnetic attraction does not substantially act between the bias chip 100a and the voice coil magnet 54.

As shown in FIG. 5, when the AHSA 15 is at a position of the center line 156, the bias chip 100i two-dimensionally overlaps the end of the voice coil magnet 54 or two-dimensionally approaches this end. Accordingly, the bias chip 100i is influenced by the magnetic leakage flux of the voice coil magnet 54. As a result, the bias chip 100i is magnetized, and thereby attraction acts between the bias chip 100i and the voice coil magnet 54, producing a bias torque. This state will be described with reference to FIG. 6.

In FIG. 6, force F1 indicates the attraction acting on the bias chip 100i by the magnetic leakage flux occurring at the end of the yoke gap between the voice coil magnet 54 and the main yoke 27, whereas force F2 indicates the reaction force applied by the pivot shaft 17 in response to the force F1. Accordingly, the force Ft into which the force F1 and the force F2 are combined acts on the bias chip 100i. The force Ft is equivalent to the torque to pivotally move the AHSA 15 in the A1 direction, which is applied to the coil support 25 supporting the bias chip 100i. This force Ft is called the bias torque Ft.

As is evident from FIG. 6, in order to apply the bias torque Ft to the bias chip 100i, it is necessary to locate the bias chip at a position where there is enough magnetic leakage flux to produce the given amount of attraction F1 exists. A distance from the end of the voice coil magnet 54 and the amount of the magnetic leakage flux determine the position where the magnetic leakage flux exists.

Moreover, in order to generate the bias torque Ft by which the attraction F1 acts in the A1 direction, the attraction F1 needs to be directed toward the A1 direction side relative to a line connected between the center of the pivot shaft 17 and the bias chip 100i. Such a configuration can be realized by selecting a shape and placement of the end of the voice coil magnet 54 relative to a position of the bias chip 100i, which can be determined by persons skilled in the art.

Figure 7:
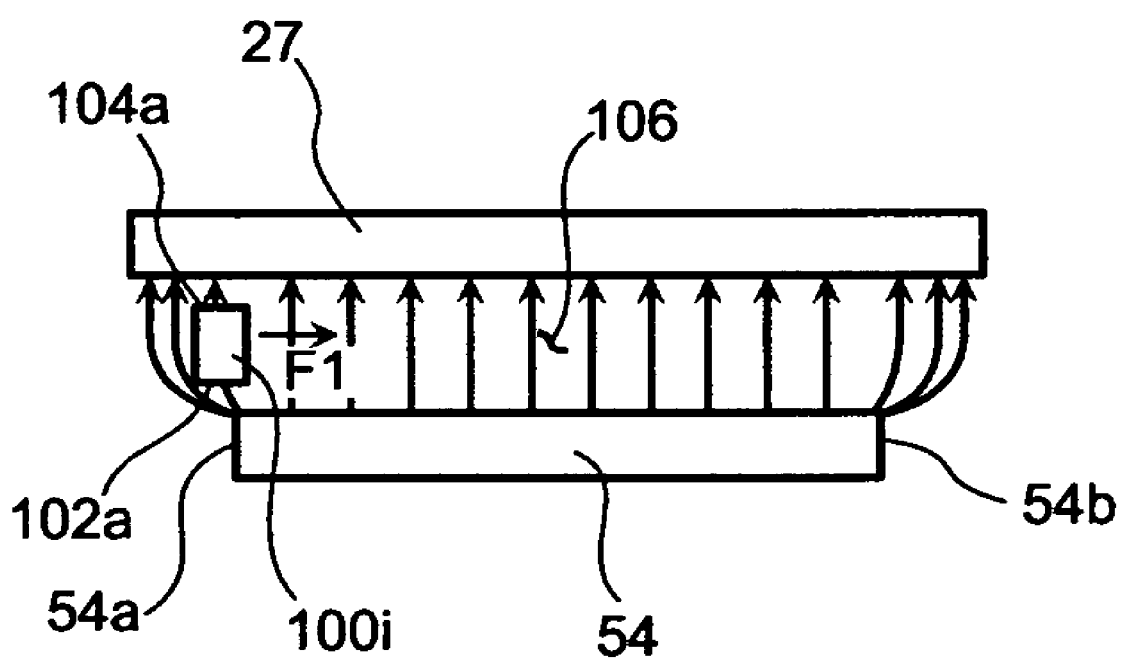
FIG. 7 is a diagram illustrating the positional relationship of the bias chip with a magnetic field produced in a yoke gap by a voice coil magnet and a main yoke.

FIG. 7 is a side view illustrating the main yoke 27, the bias chip 100i, and the voice coil magnet 54, which is obtained when cutting with a surface perpendicular to the voice coil magnet 54 shown in FIG. 6, including a direction of the force F1. FIG. 7 shows the positional relationship of the bias chip 100i with the magnetic flux produced in the yoke gap 106 by the voice coil magnet 54 and the main yoke 27. If sizes of the opposing surfaces are compared between the main yoke 27 and the voice coil magnet 54, the cross section of FIG. 7 shows a state in which the opposing surface of the main yoke 27 is larger.

The voice coil magnet 54 has planar extension. In the cross section of FIG. 7, reference numerals 54a, 54b denote ends as the extension. Magnetic lines of force of the yoke gap 106 vertically go in and out between the voice coil magnet 54 and the main yoke 27 in an area two-dimensionally delimited by the ends 54a, 54b of the voice coil magnet 54. The magnetic lines of force, therefore, do not have a component in the horizontal direction. On the other hand, in the areas close to the ends 54a, 54b of the voice coil magnet 54, the magnetic lines of force swell outward from surfaces perpendicular to the main yoke 27, each of which is assumed to extend from each end of the voice coil magnet 54 to the main yoke 27. The magnetic lines of force, therefore, have a component in the horizontal direction.

Here, the yoke gap space and magnetic leakage flux as used herein will be defined as below. Now, when the voice coil magnet 54 is opposed to the main yoke 27, a plane which is parallel to both surfaces is provided in a yoke gap as an assumption. An orthographic projection surface for each is drawn on the plane to obtain an overlapped area. Next, when moving the overlapped area with a parallel state being kept from the surface of the voice coil magnet to the surface of the main yoke, a volume area is formed by surrounding the extension of the overlapped area by a surface drawn in the yoke gap 106, a surface of the voice coil magnet, and a surface of the main yoke. Although this volume area is a part of the yoke gap, this area is in particular called yoke gap space.

The magnetic leakage flux is magnetic flux that exists in the area swelling outward from this yoke gap space. In the above-mentioned example, the magnet and the yoke form the yoke gap. However, the yoke gap space and the magnetic leakage flux are also applied to a case where the yoke gap is formed by two magnets opposed to each other. In addition, other than a case where the magnet has a surface directly in contact with a yoke gap, if the yoke has a surface in contact with a yoke gap and a magnet is attached to the back side of the yoke and thereby a yoke gap is formed by two yokes opposed to each other, the definition is made in like manner by the extension of the yoke instead of the magnet.

Returning to FIG. 7, when the bias chip 100i approaches the end 54a of the voice coil magnet or a part of the bias chip 100i enters the yoke gap space, attraction is produced between a magnetic pole of the voice coil magnet 54 and a magnetic pole formed on the surface 102a of the bias chip as a result of being magnetized by the voice coil magnet 54, causing the force F1 in FIG. 6 to act. When the bias chip 100i is far away from the end 54a of the voice coil magnet 54, the force F1 can be ignored. But, the force F1 becomes larger with decreasing distance.

However, when the bias chip 100 completely enters in the yoke gap space, the magnetic lines of force do not have a vector in the horizontal direction. Accordingly, attraction having a component which pivotally moves the AHSA 15 in the horizontal direction relative to the bias chip 100i, more specifically, in the A1 direction or in the B1 direction is not produced. Therefore, in order not to apply a bias torque to the AHSA 15, it is desirable that the bias chip 100 be placed at a position away to some extent from the yoke gap space or be placed in the yoke gap space.

Figure 8:
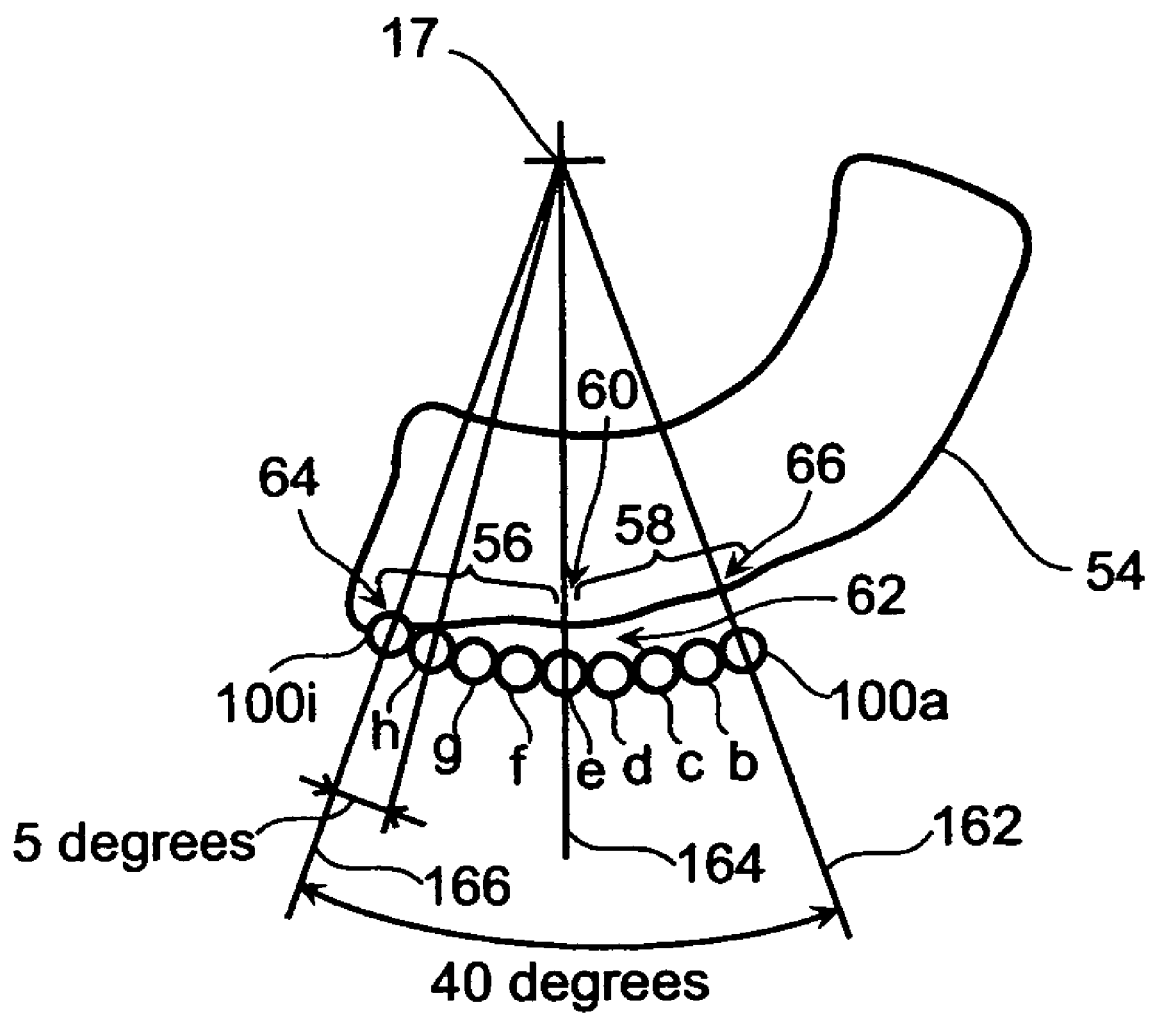
FIG. 8 is a diagram illustrating the relationship of a locus of the bias chip with ends of yoke gap space.

FIG. 8 is a diagram illustrating a relative positional relationship between a pivotal locus of the bias chip 100 and the end of the voice coil magnet 54 when pivotally moving the AHSA 15. FIG. 8 illustrates the planar extension of the voice coil magnet 54. In this embodiment, however, as shown in FIG. 5, the main yoke 27 has extension existing more outward than the extension of the voice coil magnet. Therefore, the yoke gap space becomes a volume area surrounded by a vertical surface along the extension of the voice coil magnet 54, a plane of the voice coil magnet 54, and a plane of the main yoke. Accordingly, the end of the voice coil magnet is equivalent to the end of the yoke gap space.

The yoke gap space according to this embodiment is configured to generate the bias torque Ft used as an energy source for retracting the AHSA 15 into the ramp 21 in the event that the power supply of the magnetic disk drive 10 is suddenly interrupted. In order to generate the bias torque Ft, the end of the voice coil magnet 54 is devised to have a distinctive shape and also to maintain a given relation, as described below, with respect to the pivotal locus of the bias chip 100.

In FIG. 8, bias chips 100a through 100i are illustrated at intervals of 5 degrees along the pivotal locus of the bias chips. FIG. 8 uses b through h to avoid complexity of the figure where reference numeral 100 is omitted. The pivotal locus of the bias chip is provided outside the back end of the voice coil magnet 54, that is to say, outside the back end of the yoke gap space. The present invention is not limited to this embodiment. The pivotal locus of the bias chip 100 may also be provided outside the tip of the voice coil magnet 54, which is near from the pivot shaft 17. To be more specific, the pivotal locus of the bias chip 100 may also be provided outside the tip of the yoke gap space.

A line 162 is a line connected between the center of the pivot shaft 17 and the center of the bias chip 100a when the AHSA 15 is at a position of the center line 152 in FIG. 5. To be more specific, this is a position where the AHSA 15 comes into contact with the inner crash stop 29. A line 164 is a line connected between the center of the pivot shaft 17 and the center of the bias chip 100e when the AHSA 15 is at a position of the center line 154 in FIG. 5. To be more specific, this is a position where the merge lip 19 of the AHSA 15 comes into contact with the tip of the sloping surface 21a of the ramp 21.

A line 166 is a line connected between the center of the pivot shaft 17 and the center of the bias chip 100i when the AHSA 15 is at a position of the center line 156 in FIG. 5. To be more specific, it is a position where the AHSA 15 comes into contact with the outer crash stop 31 and stops at its home position. An angle between the line 162 and the line 166 is 40 degrees. The line 164 divides the angle into two. Now, the AHSA 15 and the bias chip 100 pivotally moves as one body. Therefore, in the description below, a position of the bias chip 100 may be described with an expression that indicates a position of the AHSA 15 at that time. For example, if the bias chip 100 stays at a position of the inner crash stop 29, the AHSA 15 is placed at a position of the center line 152 in FIG. 5, which shows that the bias chip 100 is at a position of the line 162.

The voice coil magnet 54 comprises the end 56 that is configured to be close to and substantially follow the pivotal locus of the bias chip 100, and the end 58 that is configured to be away from the pivotal locus. The end 56 is formed as a projecting part that projects in a direction approaching the pivotal locus of the bias chip 100. The end 56 is devised to be capable of applying the bias torque Ft to the bias chip 100 by the magnetic leakage flux. Therefore, this end is called a bias end 56. As described above with reference to FIG. 6, the bias torque Ft can be obtained by selecting a distance between the bias end 56 and the bias chip, and a shape of the bias end 56, so that the amount of magnetic leakage flux influencing on the bias chip and a direction of the attraction F1 satisfy required conditions.

The end 58 is adjacent to the bias end 56, and is formed at a position away from the pivotal locus of the bias chip 100. The end 58 is devised not to exert a substantial influence of the magnetic leakage flux on the bias chip 100. This is called nonbias end 58. In order not to exert the substantial influence of the magnetic leakage flux, it is necessary to select a shape of the nonbias end which can keep such a distance between the nonbias end 56 and the bias chip that the amount of magnetic leakage flux influencing on the bias chip is kept within a given value.

In addition, the end 58 may also be formed so that a pivotal locus of the bias chip passes through the yoke gap space to avoid the influence of the magnetic leakage flux. This is because magnetic lines of force having a component in the horizontal direction does not exist in the yoke gap space. In this case, an end of the yoke gap space which is the nearest to the pivotal locus of the yoke gap space is equivalent to the nonbias end.

In this embodiment, the bias end 56 and the nonbias end 58 transit at a transition part 60 that exists in the vicinity of an intersection point of the line 164 and the end of the voice coil magnet. The bias end 56 is successively formed so as to be close to the pivotal locus of the bias chip from the transition part 60 to an intersection point 64 of the line 166 and the end of the voice coil magnet 54. The nonbias end is devised to be away from the bias chip to the extent that substantially no influence of the magnetic leakage flux is exerted on the bias chip from the transition part 60 to an intersection point 66 of the line 162 and the end of the voice coil magnet 54.

The end 62 of the voice coil magnet 54, which is near to the bias chip 100d, is formed into a shape projecting toward the bias chip 100d to some degree. Accordingly, the end 62 comes closer to the bias chip 100e through 100i so that the bias end 56 can apply the bias torque Ft to the bias chip 100e through 100i by magnetic leakage flux. When the bias chip 100 moves pivotally between the line 162 and the line 164, the head/slider 13 is servo-controlled while floating on the recording surface of the magnetic disk 11. At this time, the nonbias end 58 does not apply the bias torque Ft to the bias chips 100a through 100d. The influence of the magnetic leakage flux from the bias end 56 begins to be exerted on the bias chip 100 approximately from a position over the line 162 toward the line 166.

In this embodiment, it is so devised that as the bias chip 100 moves pivotally toward the line 166, the pivotal locus of the bias chip 100 gradually approaches the bias end 56. In other words, from the vicinity of a position where the head/slider 13 retracts from the recording surface of the magnetic disk 1 to the ramp 21, the bias torque Ft begins to act on the bias chip 100. Then, as the AHSA 15 comes nearer to the outer crash stop 31 or the home position, the bias torque Ft gradually increases.

Figure 9:
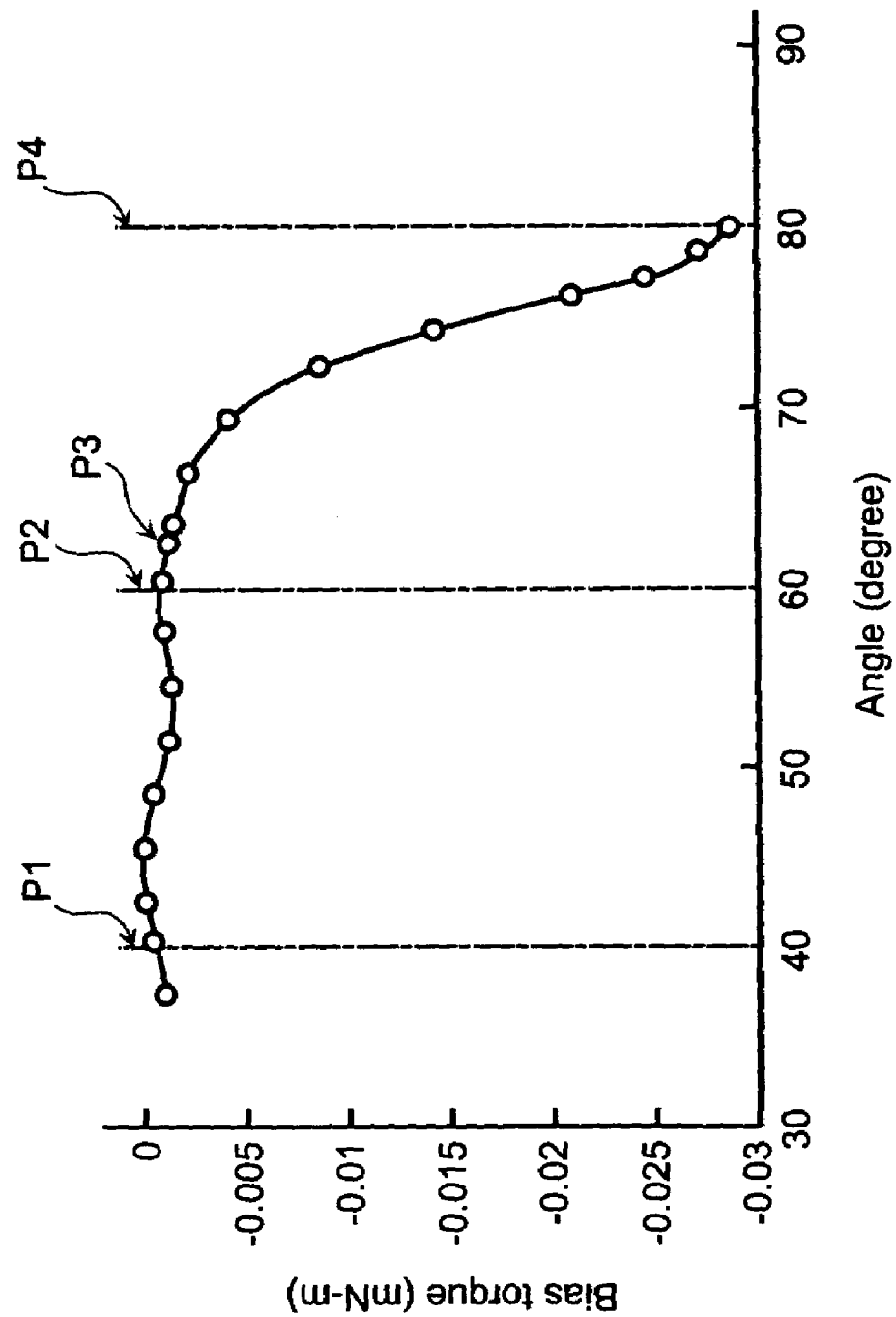
FIG. 9 is a diagram illustrating measured values of bias torque.

FIG. 9 is a diagram illustrating the result of measurement of the bias torque Ft produced when the bias chip 100 is attracted to the voice coil magnet 54. In FIG. 9, the vertical axis indicates the amount of the bias torque Ft applied to the AHSA 15; and the horizontal axis indicates a position of the AHSA 15 as an angle of the center line from the base line according to FIG. 5. A minus sign of the bias torque Ft indicates a case where the AHSA 15 is moved in the A1 direction in FIG. 1. A position P1 on the horizontal axis indicates a position of the center line 152 at which the AHSA 15 came into contact with the inner crash stop 29 in FIG. 5. A position P2 indicates a position of the center line 154 at which the merge lip 19 comes into contact with the ramp 21. A position P4 indicates a position of the center line 156 at which the AHSA 15 came into contact with the outer crash stop 31. More specifically, the position P4 is a home position.

A large part of an area included between the position P1 and the position P2 is an area where the head/slider 13 can access the recording surface of the magnetic disk. This area is called an access area. The access area does not show the whole range of the magnetic disk corresponding to the position P1 and the position P2. This is because in a magnetic disk drive that adopts the CSS method, a retraction surface for the head/slider 13, which is not a recording surface, is provided on an inner side of the magnetic disk 11. It is also because in a magnetic disk drive that adopts the load-unload method, a non-recording area is provided outside the outermost radius track. An areas from the position P2 to the position P4 is an area where the merge lip 19 engages with one of the surfaces of the ramp 21. This area is called a retraction area.

As is evident from FIG. 9, when the merge lip 19 of the AHSA 15 moves pivotally in the A1 direction, the merge lip 19 enters the retraction area where the merge lip 19 engages with the ramp 21. Then, while the merge lip 19 passes over the position P3, the bias torque gradually increases. The bias torque becomes the maximum at the position P4 that is the home position. This is how the voice coil magnet 54 and the bias chip 100, according to this embodiment, work in combination. In such a configuration, while the head/slider 13 accesses the magnetic disk, the bias torque Ft is not produced, which does not exert the influence upon the control of the AHSA performed by the VCM and a servo mechanism. However, when the head/slider 13 retracts into the ramp 21, the bias torque Ft is produced. This bias torque Ft becomes the force used to pivotally move the AHSA 15 in the A1 direction. Until the merge lip 19 reaches the home position, this force in the A1 direction is continuously provided in a manner that the force gradually increases. In the vicinity of the home position, the maximum force in the A1 direction can be provided.

The bias torque Ft which is provided from the bias end 56 is effective because the bias torque Ft compensates the torque for overcoming the frictional force until the merge lip 19 of the AHSA 15 reaches the home position while sliding on each surface of the ramp 21. As shown in FIG. 9, the bias torque records its maximum value in the vicinity of the home position of the AHSA 15. Although a maximum value of the bias torque in the access area is smaller than or equal to about 10% of the maximum value at the home position, it is desirable to set the maximum value at about 5% or less. Moreover, in order not to exert a bad influence on the control of the AHSA by the VCM in the access area, it is desirable that the maximum value of the bias torque in the access area be smaller than or equal to about 5% of the maximum value of the torque produced by an electric current flowing through the voice coil magnetic circuit and the voice coil. Optimally, it is desirable to set the maximum value at about 3% or less.

Judging from characteristics of the bias torque shown in FIG. 9, when the AHSA 15 is located at its home position, a relatively strong bias torque is generated. Accordingly, even if vibrations and a slight shock are applied to the magnetic disk drive from outside, the bias torque acts as a relatively strong force for holding the AHSA 15 in the direction of the home position. On the other hand, when the AHSA 15 moves from its home position to the B1 direction for some reason or other, the bias torque acts as a force for holding in the home position direction so long as the AHSA 15 stays in the retraction area.

In this embodiment, a pressing load of the HSA 20 is not so strong. Accordingly, if the merge lip 19 of the AHSA 15 is at a position that does not reach the flat surface 21b of the ramp 21, the bias torque Ft pulls the merge lip 19 back to the home position. If the AHSA 15 goes away from the home position, even if a well-known inertia latch mechanism for coping with a strong shock is provided, there is a case where a latch cannot be set. Therefore, working of the bias torque according to this embodiment is useful. It is because as far as such inertia latch mechanism is concerned, moving time during which the AHSA moves to a latch position by a shock, and operating time of the latch, are set with reference to the home position.

How to utilize the bias torque shown in FIG. 9 can be considered in various ways. To begin with, if the power supply is suddenly interrupted while the magnetic disk drive accesses the magnetic disk, more specifically, performs writing or reading, the AHSA 15 drives the VCM by use of an electric charge accumulated in a capacitor and/or back electromotive force of the spindle motor, as energy, to come back to the ramp as a retraction position. However, what is required here is energy that is enough to overcome the frictional force generated by the sloping surface 21a, the flat surface 21b, and the sloping surface 21c, of the ramp 21 shown in FIG. 2. In this case, depending on conditions, there is a possibility that an electric charge will be insufficient. However, it is possible to utilize the bias torque as energy for retracting the AHSA at this time. This provides a wide choice of capacitors, ensuring reliable operation of retraction.

The bias torque according to this embodiment is torque for pivotally moving the AHSA 15 in the A1 direction. Accordingly, as described above, the torque works as follows: when the AHSA 15 is at its home position, the torque holds the AHSA 15 at the home position; and even if the AHSA 15 is away from the home position, the torque works to pull the AHSA back to the home position. Although there is a technology for embedding a magnet in an outer crash stop to hold the AHSA at its home position, adopting the bias chip according to this embodiment eliminates the need for providing such a magnet. In particularly, in the case of a small-size magnetic disk drive, space for providing an additional mechanism is limited. Therefore, it is desirable to use the holding mechanism for holding the AHSA 15 at the home position by a bias torque according to this embodiment.

In addition, when the AHSA 15 collides against the outer crash stop at high speed as a result of a strong shock being delivered from outside, the bias torque can prevent the AHSA 15 from jumping out to the recording surface of the magnetic disk 11 as rebounding if a material capable of absorbing the strong impulsive force is selected as a material of an elastic member used for the outer crash stop.

In this embodiment, for the purpose of continuously applying the bias torque to the bias chip 100 moving pivotally in the retraction area, the bias ends are successively provided up to the home position of the bias chip in a manner that the bias ends are close to and substantially follow the pivotal locus of the bias chip. However, other than the mode in which the bias ends are continuously provided, embodiments of the present invention include the following modes: bias ends and nonbias ends are alternately provided; and a bias end is provided at only one position of the pivotal locus of the bias chip, for instance, a part of the retraction area.

The embodiments of the present invention are not limited to the relationship of the ends of the voice coil magnet 54 with the bias chip 100 described above with reference to FIGS. 8 and 9. It is possible to obtain various kinds of bias torque characteristics by configuring bias ends of the voice coil magnet 54 relative to a pivotal locus of the bias chip 100 in various ways. For example, a projecting part with a shape projecting to further approach the bias chip is formed at the end of the voice coil magnet that is close to the bias chips 100d through 100e in FIG. 8, and thereby strong bias torque is produced in a part where the merge lip 19 begins to engage with the ramp 21.

After that, a distance between the bias end and the bias chip is made relatively wide to weaken the bias torque. Lastly, the distance between the bias chip and the bias end is shortened at the maximum again in the vicinity of the home position to produce the largest bias torque. Such bias torque characteristics are suitable for the following case: the torque is increased when the merge lip ascends the first sloping surface of the ramp at the time of unload; and then torque for sliding the merge lip on the ramp, and thereby for moving the merge lip to the home position, is made relatively weak to prevent the AHSA from colliding against the outer crash stop at high speed; and strong bias torque is produced at the home position.

For the magnetic disk drive of the CSS method in which a retraction surface is formed further inside the innermost radius track of the magnetic disk, the voice coil magnet 54 is formed in a shape whereby bias torque is produced in the B1 direction approximately from an area where the head/slider 13 passes over the innermost radius track and goes toward the center. Moreover, as shown in FIG. 8, the transition part between the bias end 56 and the nonbias end 58 does not always need to be limited to a position at which the merge lip 19 engages with the ramp 21, such as an area in the vicinity of the intersection point with the line 164. It may also be so devised that the bias torque is produced in the access area, or that the bias torque is produced in an area in the vicinity of the retraction surface 21b of the ramp.

Up to this point, the present invention was described on the basis of specific embodiments illustrated in the diagrams. The present invention, however, is not limited to the specific embodiments illustrated in the diagrams. Any modifications which are known in the past can also be made to the embodiments of the present invention, and other embodiments can also be adopted, both of which will be able to be understood by persons skilled in the art.

The present invention can be utilized for any kind of rotating disk storage device, and in particular can be utilized for a rotating disk storage device used in an environment that is subject to a shock. Further, the present invention can be utilized for a small-size rotating disk storage device in which space for providing a latch mechanism and a retraction mechanism is limited.

What is claimed is:

1. A rotating disk storage device comprising:
   a rotating disk recording medium;
   an actuator head suspension assembly including a head/slider that is accessible to the rotating disk recording medium; a voice coil for pivotally moving said head/slider in a first direction in which the head/slider moves from an access area above the rotating disk recording medium toward a retraction area, and in a second direction in which the head/slider moves from the retraction area toward the access area; and a coil support for supporting the voice coil;
   a bias chip that is mounted to the actuator head suspension assembly, and that pivotally moves in the first direction and in the second direction; and
   a voice coil magnetic circuit having a yoke gap space where a bias end is formed as a projecting part that projects in a direction approaching a pivotal locus of the bias chip in the vicinity of an on-route position within a pivoting range of the bias chip, the rotating disk storage device further comprising a ramp, wherein the retraction area is structured by the load-unload method.

2. A rotating disk storage device according to claim 1, wherein:
   said projecting part is provided up to a position in the vicinity of a home position of the bias chip so that the projection part is close to and substantially follows a pivotal locus of the bias chip in the first direction.

3. A rotating disk storage device according to claim 1, wherein said projecting part is provided in the vicinity of the bias chip located at a border between the access area and the retraction area.

4. A rotating disk storage device according to claim 1, wherein said projecting part and the pivotal locus of the bias chip gradually come closer to each other as the actuator head suspension assembly moves pivotally in the first direction.

5. A rotating disk storage device according to claim 1, wherein said bias chip is mounted to the coil support, and a part of the pivotal locus of the bias chip passes through the yoke gap space.

6. A rotating disk storage device according to claim 1, wherein at a home position of the bias chip, at least a part of the bias chip enters the yoke gap space.

7. A rotating disk storage device according to claim 1, wherein the yoke gap space of the voice coil magnetic circuit is formed of a voice coil magnet and a voice coil yoke.

8. A rotating disk storage device according to claim 1, wherein said bias chip is formed of a metal chip or a magnet chip.

9. A rotating disk storage device according to claim 1, wherein said rotating disk recording medium has a retraction surface, and the retraction area is structured by the contact start stop method.

* * * * *